United States Patent
Lee

(10) Patent No.: US 12,028,789 B2
(45) Date of Patent: Jul. 2, 2024

(54) METHOD AND APPARATUS FOR PROVIDING BROADCASTING INFORMATION BASED ON MACHINE LEARNING

(71) Applicants: Hyundai Motor Company, Seoul (KR); Kia Corporation, Seoul (KR)

(72) Inventor: Sang Heun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 241 days.

(21) Appl. No.: 17/643,898

(22) Filed: Dec. 13, 2021

(65) Prior Publication Data

US 2023/0066925 A1 Mar. 2, 2023

(30) Foreign Application Priority Data

Aug. 26, 2021 (KR) .................. 10-2021-0113013

(51) Int. Cl.
| | |
|---|---|
| *H04W 4/46* | (2018.01) |
| *G06F 18/214* | (2023.01) |
| *G06N 20/00* | (2019.01) |
| *H04W 76/14* | (2018.01) |
| *H04W 76/19* | (2018.01) |

(52) U.S. Cl.
CPC .......... *H04W 4/46* (2018.02); *G06F 18/2155* (2023.01); *G06N 20/00* (2019.01); *H04W 76/14* (2018.02); *H04W 76/19* (2018.02)

(58) Field of Classification Search
CPC ....... H04W 4/46; H04W 76/19; H04W 76/14; G06N 20/00; G06F 18/2155
USPC ........................................................ 340/902
See application file for complete search history.

(56) References Cited

U.S. PATENT DOCUMENTS

| | | | | |
|---|---|---|---|---|
| 6,615,130 | B2 * | 9/2003 | Myr .................. | G01C 21/3492 340/988 |
| 9,466,212 | B1 * | 10/2016 | Stumphauzer, II .... | G08G 1/137 |
| 10,200,882 | B1 * | 2/2019 | Nelapati ................ | H04W 4/44 |
| 10,439,845 | B1 * | 10/2019 | Heath, Jr. ............ | H04B 7/0452 |
| 11,113,567 | B1 * | 9/2021 | Durand ................... | G06N 20/00 |
| 11,184,734 | B1 * | 11/2021 | Carraway ............... | H04W 4/90 |
| 11,530,925 | B1 * | 12/2022 | Shields ............ | G08G 1/096741 |
| 11,770,197 | B2 * | 9/2023 | Zhang .................. | H04B 17/309 382/103 |
| 11,787,467 | B2 * | 10/2023 | Shibata ............ | G08G 1/096758 701/41 |
| 2003/0101103 | A1 * | 5/2003 | Otsubo .............. | G06Q 30/0601 705/26.1 |

(Continued)

*Primary Examiner* — Kerri L McNally
*Assistant Examiner* — Thang D Tran
(74) *Attorney, Agent, or Firm* — Slater Matsil, LLP

(57) ABSTRACT

In accordance with an embodiment, a method of operating a vehicle server in line with a plurality of vehicle terminals includes collecting broadcasting station titles of broadcasting channels serviced at respective positions; collecting position information from the plurality of vehicle terminals; constructing big data based on the collected broadcasting station titles and position information; learning a relationship between the position information and the broadcasting station titles using machine learning based big data analysis; and generating a broadcasting station title estimating model for estimating broadcasting station titles corresponding to the position information of the plurality of vehicle terminals.

20 Claims, 8 Drawing Sheets

(56) References Cited

U.S. PATENT DOCUMENTS

| | | | |
|---|---|---|---|
| 2006/0195239 A1* | 8/2006 | Teichner | H04H 20/26 701/469 |
| 2011/0017872 A1* | 1/2011 | Bezos | B64G 1/62 244/158.9 |
| 2011/0121992 A1* | 5/2011 | Konaka | G01C 21/3697 340/905 |
| 2012/0327840 A1* | 12/2012 | Chen | H04L 45/54 370/315 |
| 2013/0203340 A1* | 8/2013 | Namba | H04H 20/26 455/3.06 |
| 2015/0006076 A1* | 1/2015 | Guo | G01C 21/362 701/533 |
| 2015/0339919 A1* | 11/2015 | Barnett | F21S 8/086 340/907 |
| 2016/0117690 A1* | 4/2016 | Helm | G06Q 30/0201 705/7.29 |
| 2016/0127750 A1* | 5/2016 | Son | H04N 21/251 725/14 |
| 2016/0295286 A1* | 10/2016 | Kang | H04N 21/482 |
| 2017/0032402 A1* | 2/2017 | Patsiokas | G06Q 30/0207 |
| 2017/0033854 A1* | 2/2017 | Yoo | H04W 24/10 |
| 2017/0124878 A1* | 5/2017 | Enright | G08G 1/163 |
| 2017/0160370 A1* | 6/2017 | Yakubisin | G01R 29/0842 |
| 2017/0169532 A1* | 6/2017 | Appel | G06Q 50/265 |
| 2018/0007521 A1* | 1/2018 | Meredith | H04W 4/46 |
| 2018/0014351 A1* | 1/2018 | Coutinho | H04W 84/005 |
| 2018/0159609 A1* | 6/2018 | Yu | H04W 24/10 |
| 2018/0242115 A1* | 8/2018 | Kim | H04W 8/02 |
| 2018/0301034 A1* | 10/2018 | Morita | G01C 21/3492 |
| 2019/0394624 A1* | 12/2019 | Karampatsis | H04W 76/15 |
| 2020/0296659 A1* | 9/2020 | Kunjar | G01S 7/023 |
| 2021/0092558 A1* | 3/2021 | Duan | H04W 64/00 |
| 2021/0110709 A1* | 4/2021 | Raviv | G06N 20/00 |
| 2021/0143924 A1* | 5/2021 | Zhang | H04W 4/44 |
| 2021/0194733 A1* | 6/2021 | Huangfu | G06N 3/084 |
| 2021/0219299 A1* | 7/2021 | Peng | H04W 4/50 |
| 2021/0312796 A1* | 10/2021 | Lull | G06V 20/56 |
| 2021/0336687 A1* | 10/2021 | Pezeshki | H04B 7/088 |
| 2022/0035859 A1* | 2/2022 | Lidaka | G06F 3/165 |
| 2022/0075369 A1* | 3/2022 | Simsek-Ege | G07C 5/008 |
| 2022/0182975 A1* | 6/2022 | Lei | G08G 1/096725 |
| 2022/0201779 A1* | 6/2022 | Nakamura | H04W 40/12 |
| 2022/0223286 A1* | 7/2022 | Lach | G16H 80/00 |
| 2023/0144714 A1* | 5/2023 | Manolakos | H04L 5/0051 455/456.1 |

* cited by examiner

METHOD AND APPARATUS FOR PROVIDING BROADCASTING INFORMATION BASED ON MACHINE LEARNING

This application claims priority to and the benefit of Korean Patent Application No. 10-2021-0113013 filed in the Korean Intellectual Property Office on Aug. 26, 2021, the entire contents of which are incorporated herein by reference.

TECHNICAL FIELD

The present invention relates to a method and device for providing machine learning based broadcasting information.

BACKGROUND

An audio video navigation (AVN) system of a vehicle is a system that includes an audio device, a video device, and a navigation device.

The AVN system is configured to receive radio frequencies, as well as broadcasting station information regarding the received radio frequencies. An AVN system may scan radio frequencies in a number of ways. One method is to scan the broadcasting station channel frequencies using a radio tuner and setting the scanned channel frequencies. Another method is to have the AV N system (1) store a database (DB) that includes frequency information for various regions and broadcasting station information corresponding to the frequency information for the respective regions; (2) check the region by using the position of vehicle, for example, a latitude and a longitude; and (3) set frequency information and broadcasting station using the checked region.

However, in such a case, an operator manually updates the broadcasting station information DB installed in the AVN system, which may create problems. For example, some frequencies may be received in which broadcasting station titles are omitted. The broadcasting station information DB of the AVN system may be based on legal district codes, so the frequencies and the broadcasting stations are not matched.

For example, the broadcasting signal transmitted in a metropolitan area may be received in adjacent Dangjin-koon in Choongchung Namdo, Asan-si, and Chunan-si as well as Kyunggi-do. However, this area has the legal district code of not Kyunggi-do but Choongchung Namdo, so when metropolitan broadcasting is received, the DB has no broadcasting station information. When metropolitan broadcasting station DB information is reflected to Dangjin-koon, Asan-si, and Chunan-si that are near Kyunggi-do, the metropolitan broadcasting may be received in Seosan-si, Yesan-koon, Yeonki-koon, and even in Kongjoo-si, so the reference of selecting the legal district code for applying metropolitan broadcasting station DB information is ambiguous. Therefore, the metropolitan broadcasting station DB in Dangjin-koon, Asan-si, and Chunan-si that are administrative divisions of Choongchung Namdo and may certainly receive the broadcasting is reflected, so when the metropolitan broadcasting is received in other areas of Choongchung Namdo, broadcasting station information, that is, the broadcasting station title, is omitted.

Further, when the broadcasting station information DB is generated, the system operator matches the broadcasting station and the legal district code. For example, the broadcasting station information may be arranged in a column and the legal district codes may be arranged in a row. Thus, the broadcasting station information DB may be generated by matching the rows and columns. A diagonal direction of the matrix represents a portion where the broadcasting station matches the legal district code, which providing a high matching possibility, while other portions thereof that are not in the diagonal direction have high non-matching possibilities. That is, the conventional broadcasting station information DB is passively managed by a manager, which may result in a so there is a high possibility of error.

The above information disclosed in this Background section is only for enhancement of understanding of the background of the invention, and therefore it may contain information that does not form the prior art that is already known in this country to a person of ordinary skill in the art.

SUMMARY

Some embodiments of the present invention provide a method and device for constructing big data based on information collected from vehicle terminals, and extracting a broadcasting station title corresponding to a position of a vehicle according to machine learning based on big data analysis.

An embodiment of the present invention provides an operation method of a vehicle server operable in line with a plurality of vehicle terminals, including: collecting broadcasting station titles of broadcasting channels serviced at position information for respective pieces of position information received from the vehicle terminals, and constructing big data; and learning a relationship between the position information and the broadcasting station title according to machine learning based big data analysis, and generating a broadcasting station title estimating model for estimating broadcasting station titles corresponding to position information of the vehicle terminals.

The constructing of big data may include receiving broadcasting receiving information heard at the vehicle position for the respective vehicle positions from the vehicle terminals, and constructing the big data by using the received broadcasting receiving information.

The generating of a broadcasting station title estimating model may include generating labelling data configured with various pieces of position information in which a plurality of broadcasting station titles are labelled from the big data, and generating the broadcasting station title estimating model by training the labelling data according to a supervised learning method.

The listened broadcasting receiving information may be received through a connected car service (CCS) message.

The method may further include, after the generating, generating a broadcasting channel DB on which estimated broadcasting station titles are mapped by using the broadcasting station title estimating model for a plurality of predefined positions, and transmitting the broadcasting channel DB to the vehicle terminals.

The method may further include, after the generating, receiving a broadcasting station title request including present vehicle position information from the vehicle terminal, estimating a broadcasting station title corresponding to the present vehicle position information by using the broadcasting station title estimating model, and transmitting the estimated broadcasting station title to the vehicle terminal.

Another embodiment of the present invention provides a vehicle server including: a communication device for communicating with a plurality of vehicle terminals; a big data database for storing big data including broadcasting station titles of broadcasting channels serviced at position information for the respective position information expressed in various ways; a memory for storing a vehicle server operating program; and at least one processor for performing the program, wherein the program includes instructions for generating and storing the big data by collecting broadcasting receiving information listened at a position for respective positions of the vehicle from the vehicle terminals, learning a relationship between the position information and the broadcasting station title according to a machine learning based big data analysis, and generating a broadcasting station title estimating model for estimating a broadcasting station title corresponding to position information of the vehicle terminal.

The program may include instructions for setting a plurality of serviced broadcasting station titles with labels, learning labelling data configured with various types of position information in which a plurality of broadcasting station titles are labelled and the big data according to a supervised learning method, and generating the broadcasting station title estimating model.

The program may include instructions for collecting vehicle position information including latitudes and longitudes, and using the collected vehicle position information to learn the broadcasting station title estimating model.

The program may further include instructions for inferring listening tendencies of the driver based on at least one of a time zone, a region, and a vehicle type according to the machine learning based big data analysis, and generating a broadcasting recommending model for recommending a broadcasting channel corresponding to the inferred listening tendencies.

In some embodiments, service is improved by applying the machine learning method so that the omitted broadcasting station titles may be provided, thereby increasing user convenience.

DETAILED DESCRIPTION OF ILLUSTRATIVE EMBODIMENTS

Figure 1:
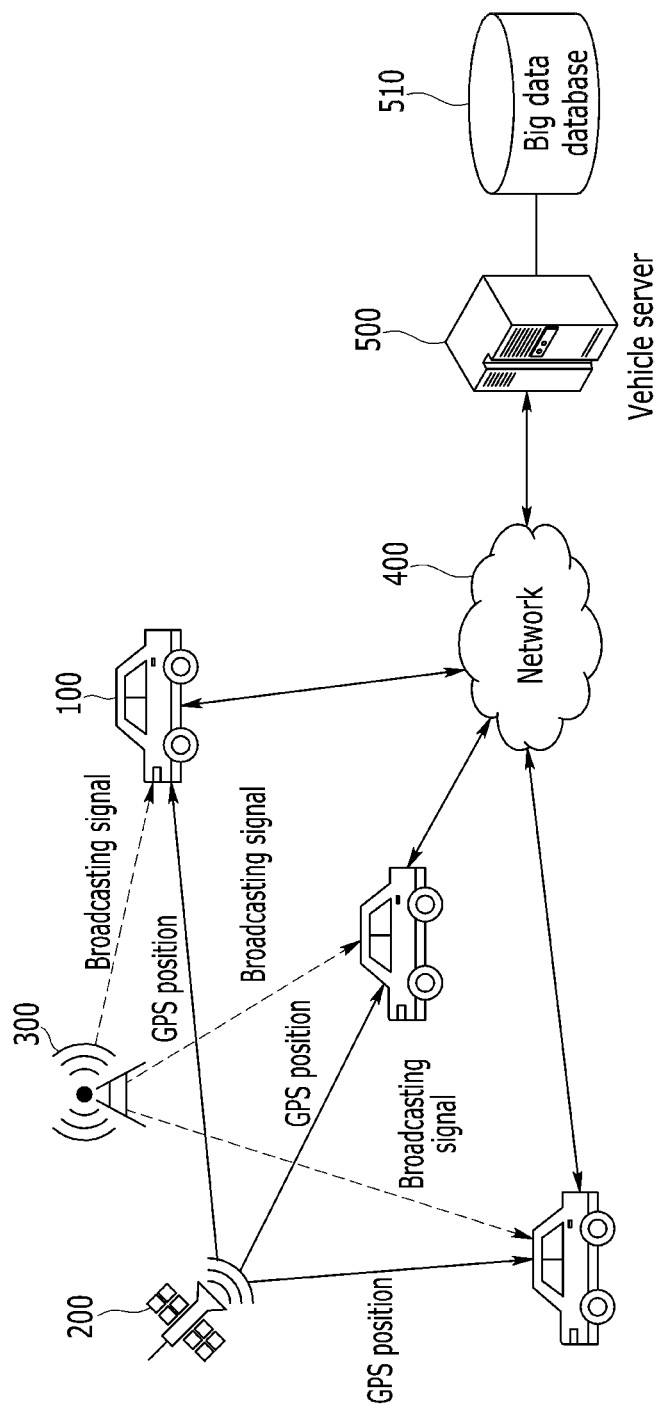
FIG. 1 shows a schematic diagram of a system for providing machine-learning-based broadcasting information according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function and operation, and can be implemented by hardware components or software components and combinations thereof.

Devices described in the present specification are configured with at least one processor, a memory, and a communication apparatus as its hardware, and a program performed in combination with hardware is stored in a designated location. The hardware has a configuration and performance for performing the method according to the present invention. The program includes instructions having realized an operation method of the present invention described with reference to drawings, and the present invention is performed in combination with hardware such as a processor or a memory.

In the present specification, "transmission or provision" may include indirect transmission or provision via another device or by use of a bypass in addition to direct transmission or provision.

In the present specification, an expression recited in the singular may be construed as singular or plural unless the expression "one", "single", etc., is used.

In this specification, regardless of the drawing, the same drawing numbers refers to the same constituent elements, and "and/or" includes all combinations of each and at least one of the constituent elements mentioned.

Terms including ordinal numbers such as first, second, and the like, will be used only to describe various components, and are not to be interpreted as limiting these components. The terms are only used to differentiate one component from others. For example, while not digressing from the claims according to the present invention, a first constituent element may be called a second constituent element, and similarly, the second constituent element may be called the first constituent element.

In the flowcharts described with reference to the drawings in this specification, the operation order may be changed, various operations may be merged, certain operations may be divided, and certain operations may not be performed.

FIG. 1 shows a schematic diagram of a system for providing machine learning based broadcasting information according to an embodiment.

As shown in FIG. 1, a plurality of vehicle terminals boo receive a global positioning system (GPS) position for indicating a present vehicle position from a global navigation satellite system (GNSS) 200. The vehicle terminals 100 receive a broadcasting signal serviced at the present vehicle position from the broadcasting station 300 and output the same according to selection by a driver.

The vehicle terminals 100 transmit the GPS position and broadcasting receiving information listened at a corresponding position to a vehicle server 500 through a network 400. The transmission to the vehicle server 500 may be performed for predetermined periods.

The network 400 may use various communication skills to be used for vehicle communication.

The vehicle server 500 may be a newly added element according to an embodiment of the present invention. The vehicle server 500 may be a server for providing a connected car service.

The vehicle server 500 is operable in line with a plurality of vehicle terminals 100. The vehicle server 500 constructs big data by collecting broadcasting station titles of serviced broadcasting channels from position information for respective position information expressed in various methods. The vehicle server 500 receives broadcasting receiving information listened at the vehicle position for the respective vehicle positions from the vehicle terminals 100, and stores the big data constructed by using the received broadcasting receiving information into a big data database 510. The big data database 510 includes broadcasting station titles of broadcasting channels serviced from position information for respective position information expressed in various ways.

The vehicle server 500 learns a relationship between position information and a broadcasting station title according to machine-learning-based big data analysis, and generates a broadcasting station title estimating model for estimating a broadcasting station title corresponding to position information of a vehicle terminal.

The vehicle server 500 may set serviced broadcasting station titles with labels, may learn labelling data configured with various pieces of position information to which a plurality of broadcasting station titles are labelled and big data according to a supervised learning method, and may generate the broadcasting station title estimating model.

The vehicle server 500 may use the broadcasting station title estimating model to increase a matching probability of position information and broadcasting station information.

Figure 2:
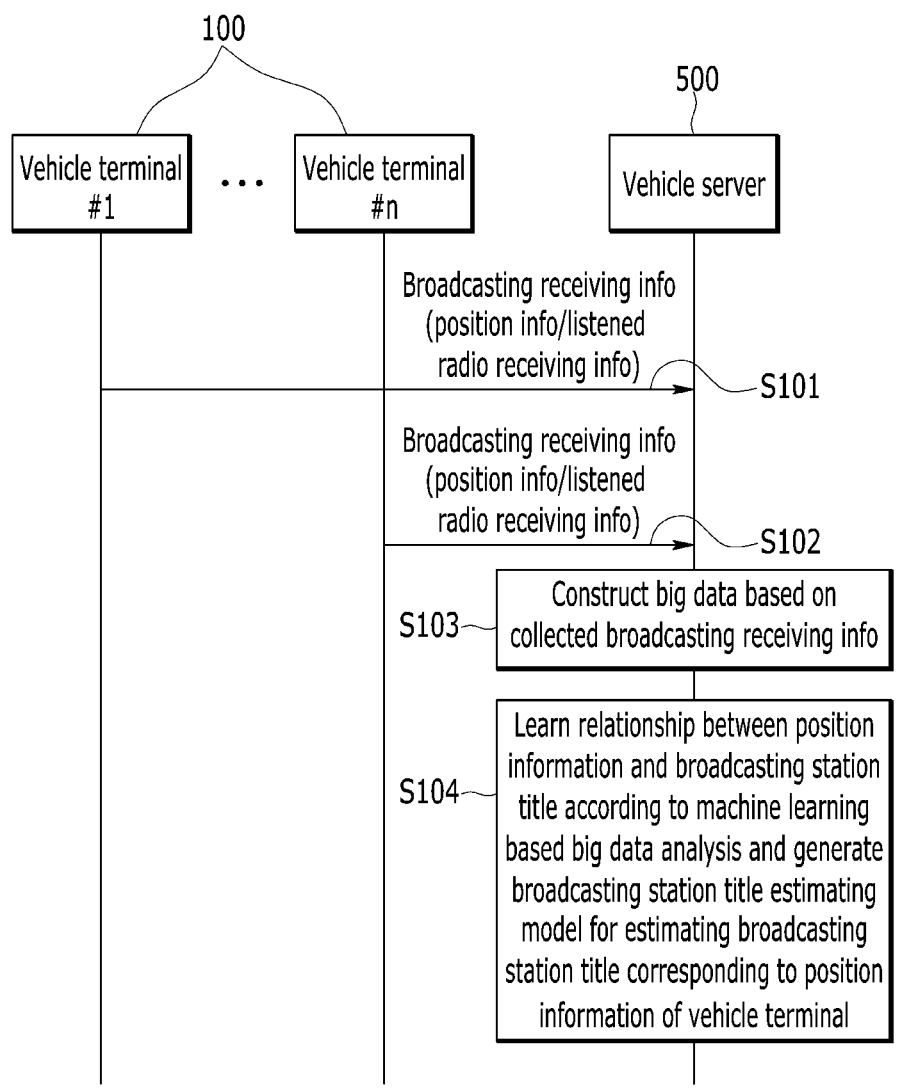
FIG. 2 shows a flowchart of a process for generating a model for estimating broadcasting station titles according to an embodiment.
Figure 3:
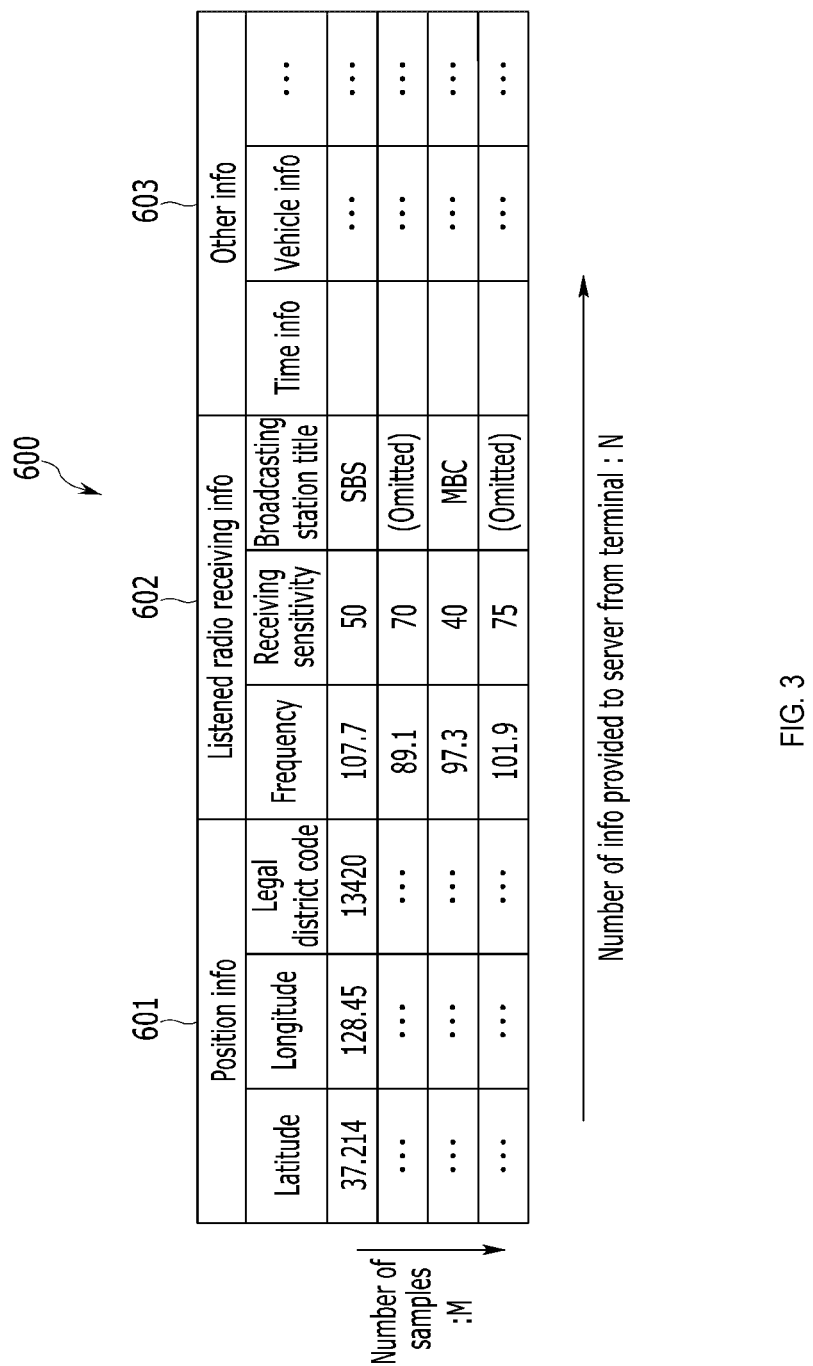
FIG. 3 shows a configuration of broadcasting receiving information collected from a vehicle terminal according to an embodiment.
Figure 4:
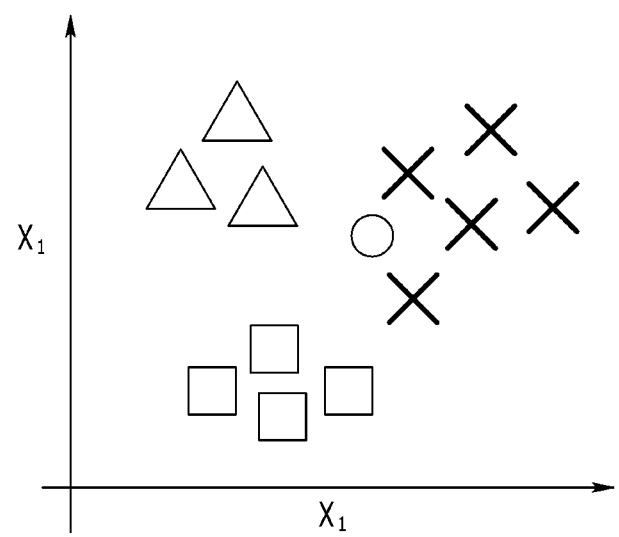
FIG. 4 shows matching of vehicle positions and broadcasting station titles according to an embodiment.

FIG. 2 shows a flowchart of a process for generating a model for estimating broadcasting station titles according to an embodiment, FIG. 3 shows a configuration of broadcasting receiving information collected from a vehicle terminal according to an embodiment, and FIG. 4 shows matching of vehicle positions and broadcasting station titles according to an embodiment.

As shown in FIG. 2, the vehicle server 500 receives broadcasting receiving information from the vehicle terminals 100 (S101 and S102). The broadcasting receiving information may be received through a CCS message.

Referring to FIG. 3, broadcasting receiving information 600 may include position information 601, listening radio receiving information 602, and other information 603. The broadcasting receiving information 600 may include N-numbered information received from the vehicle terminal 100, and may include M-numbered vehicle unit information acquired from the vehicle terminals 100.

The position information 601 includes legal district codes, and latitudes and longitudes acquired by the vehicle terminal 100 from GPS (Global Positioning System) information. Here, the legal district codes represent codes administrative district units designated by law.

The listening radio receiving information 602 includes a frequency, receiving sensitivity, and a broadcasting station title of the broadcasting channel. The broadcasting station title may be omitted.

The other information 603 may include vehicle information such as time information and vehicle types.

Broadcasting receiving information provided by the vehicle terminal 100 represents information with N-numbered characteristics, and it may be expressed as $x_1, x_2, x_3, x_4, \ldots, x_N$. The broadcasting receiving information has the total number of M, and may be expressed as $x^1, x^2, x^3, x^4, \ldots, x^{(M)}$. Here, the total sample number of M is very big so it may be considered as big data.

Referring to FIG. 2, the vehicle server 500 construct the big data based on the broadcasting receiving information collected from the vehicle terminals 100 (S103).

The vehicle server 500 learns the relationship between the position information and the broadcasting station title according to a machine learning based big data analysis and generates a broadcasting station title estimating model for estimating the broadcasting station title corresponding to position information of the vehicle terminal 100 (S104).

The vehicle server 500 may use various types of machine learning skills. For example, the vehicle server 500 may sets the broadcasting station title with a label (y), may perform a machine learning based on the big data on various inputs (x), and may generate a broadcasting station title estimating model. It corresponds to the supervised learning from among various methods of the machine learning of the vehicle server 500, and it may use various supervised learning algorithms such as a K-nearest neighbor algorithm (KNN), a linear regression, a logistic regression, a decision tree, a random forest, and an artificial neural network.

The vehicle server 500 may learn the relationship between the latitude, the longitude, the legal district code of the vehicle, the frequency, and the receiving sensitivity of the broadcasting channel and the broadcasting station title to thus generate a broadcasting station title estimating model for estimating the broadcasting station title with high accuracy on the various inputs. Referring to FIG. 4, the broadcasting station title estimating model may be learned so that $x_1$ may be the longitude, $x_2$ may be the latitude, and respective classes may sort the broadcasting station titles.

Figure 5:
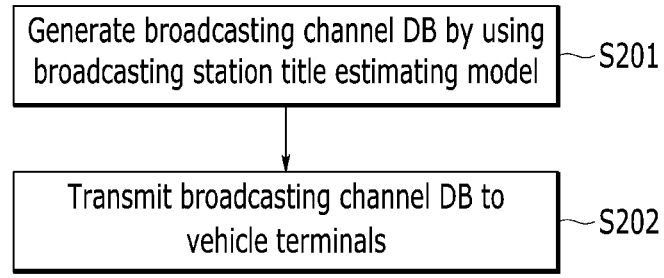
FIG. 5 shows a flowchart of a process for providing a broadcasting channel DB according to an embodiment.

FIG. 5 shows a flowchart of a process for providing a broadcasting channel DB according to an embodiment.

Referring to FIG. 5, the vehicle server 500 generates a broadcasting channel DB by using the broadcasting station title estimating model (S201). The broadcasting channel DB stores mapped broadcasting station titles estimated by using the broadcasting station title estimating model for respective predefined positions.

The vehicle server 500 may transmit the broadcasting channel DB generated in S201 to the vehicle terminals 100 in a periodical update way (S202).

Figure 6:
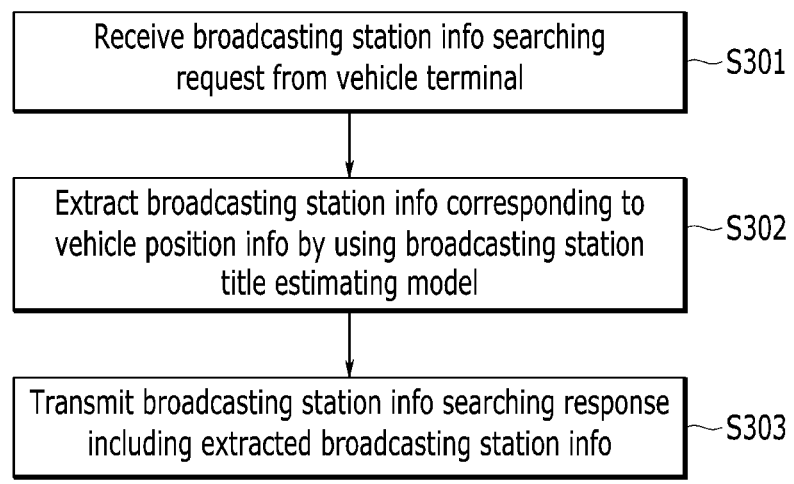
FIG. 6 shows a flowchart of a process for searching broadcasting station information according to an embodiment.

FIG. 6 shows a flowchart of a process for searching broadcasting station information according to an embodiment.

Referring to FIG. 6, the vehicle server 500 receives a broadcasting station information searching request from the vehicle terminal 100 (S301). The broadcasting station information searching request may be transmitted when a specific button installed in the vehicle, is clicked. For example, the specific button may a button for a broadcasting station information hound function such as the sound hound.

The vehicle terminal 100 may transmit a broadcasting station information searching request when the broadcasting signal is normally received but the broadcasting station title is omitted.

The broadcasting station information searching request may include position information of the vehicle terminal 100, that is, the latitude and the longitude.

The vehicle server 500 extracts the broadcasting station title corresponding to the vehicle position information acquired from the broadcasting station information searching request by using the broadcasting station title estimating model (S302).

The vehicle server 500 transmits a broadcasting station information searching response including the broadcasting station title extracted in S302 to the vehicle terminal 100 (S303).

As described above, according to an embodiment, the broadcasting station DB is updated not by the user's manual work according to prior art but automatically based on the big data, so performance of providing broadcasting channel information according to positions may be automatically and consistently. The model learned based on not the "legal district code" corresponding to a predetermined region but the "accurate latitude and the longitude" is used, so accuracy may be increased, and the problem of omitting the broadcasting station title or mismatching the broadcasting station titles may be solved.

According to an embodiment, the vehicle server 500 may generate a broadcasting recommending model according to machine learning based big data analysis, and may provide various broadcasting recommending services by using the same.

Figure 7:
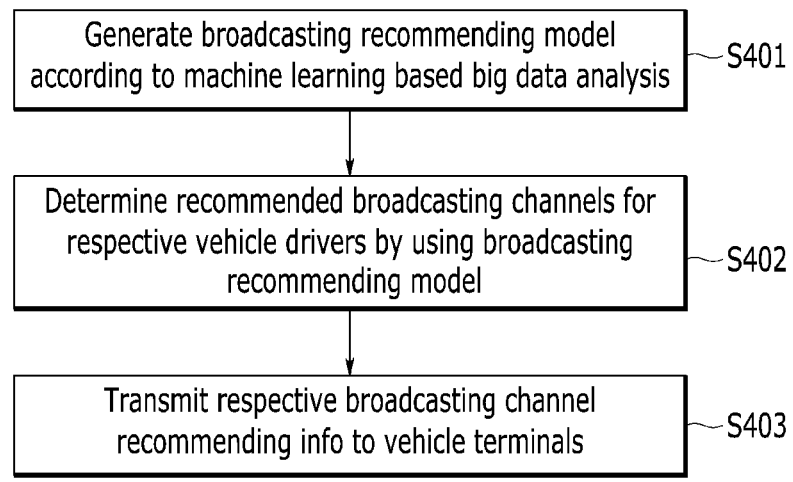
FIG. 7 shows a flowchart of a process for recommending broadcasting information according to an embodiment.

FIG. 7 shows a flowchart of a process for recommending broadcasting information according to an embodiment.

Referring to FIG. 7, the vehicle server 500 infers listening tendencies of the driver based on at least one of a time zone, a region, and a vehicle type according to the machine learning based big data analysis, and generates a broadcasting recommending model for recommending a broadcasting channel corresponding to the inferred listening tendencies (S401). The vehicle server 500 may use an unsupervised learning algorithm such as K-means clustering.

The vehicle server 500 determines recommending broadcasting channels for respective vehicle drivers by using the broadcasting recommending model (S402), and transmits respective broadcasting channel recommending information to the vehicle terminals 100 (S403).

When a broadcasting recommending request is received from an arbitrary vehicle terminal 100 before S402, the recommending broadcasting channel may be determined for the vehicle terminal 100.

In another way, the vehicle server 500 may periodically determine the recommending broadcasting channel of the vehicle terminal wo and may provide the same.

Therefore, when accurately finding the broadcasting station, the vehicle server 500 may find information on other frequencies of the same broadcasting while, for example, traveling between Seoul and Busan, and may find the same broadcasting and may provide the same while traveling.

According to an embodiment, the vehicle server 500 may provide a broadcasting recommending service according to personal preferences by using the broadcasting recommending model. That is, the vehicle server 500 may analyze the big data on the listening tendency of the long-term driver and may provide a service for recommending frequently listening broadcasting programs. The broadcasting programs may be recommended by specific time zones or specific areas.

According to another embodiment, the vehicle server 500 may provide the broadcasting recommending service to which preferences of the listener on the same vehicle type or similar vehicle types. For example, the vehicle server 500 may provide a broadcasting service for analyzing listening preferences of the driver on specific vehicle types such as Sonata or Grandeur and recommend the same. Here, they may be recommended by classification of specific time zones or specific areas.

According to another embodiment, the vehicle server 500 may provide a broadcasting recommending service to which results of analysis on the entire vehicle types are reflected. That is, the vehicle server 500 may recommend the broadcasting according to classification of the entire vehicle types by specific time zones or specific areas.

Figure 8:
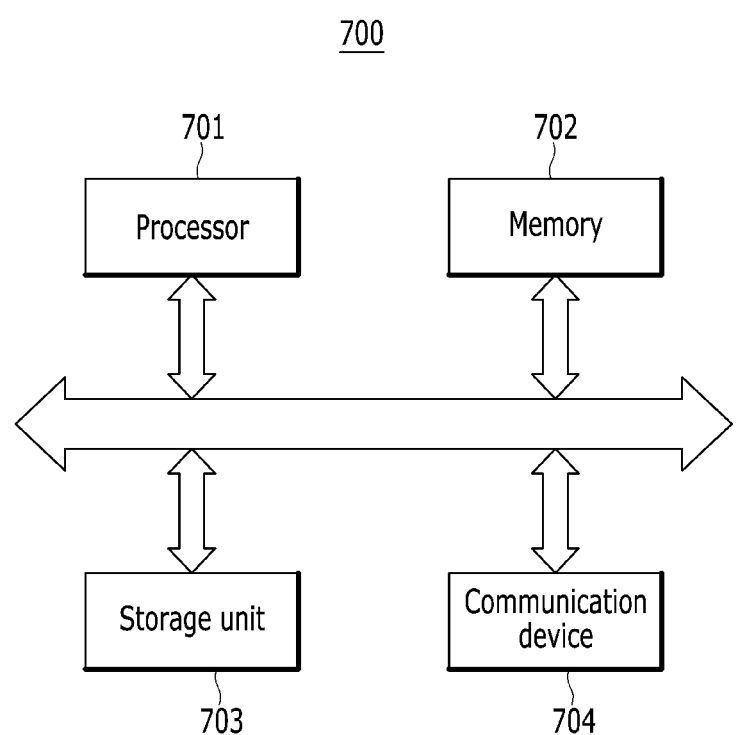
FIG. 8 shows a hardwired schematic diagram of a computing device for providing machine learning based broadcasting information according to an embodiment.

FIG. 8 shows a hardwired schematic diagram of a computing device for providing machine learning based broadcasting information according to an embodiment.

Referring to FIG. 8, the vehicle server 500 described with reference to FIG. 1 to FIG. 7 may be realized with at least one computing device 700, and may implement a computer program including instructions programmed to perform the operation according to the present disclosure.

The computing device 700 may include at least one processor 701, a memory 702, a storage unit 703, and a communication device 704 as hardware, and may be connected through a bus. The computing device 700 may further include various configurational elements such as registers, conductors, or capacitors.

The processor 701 controls operations of the computing device, it may be various types of processors for processing the instructions included in the computer program, for example, a central processing unit (CPU), a microprocessor unit (MPU), a microcontroller unit (MCU), and a graphics processing unit (GPU). The processor may perform an operation on the program for performing the above-described method.

The memory 702 stores various types of data, instructions, and/or information. The memory 702 may load the corresponding computer program so that the instructions written to perform the operation of the present disclosure may be processed by the processor 701. The memory 702 may, for example, be a read only memory (ROM) or a random access memory (RAM). The storage unit 703 may store various data and computer programs for performing the operation of the present disclosure. The storage unit 703 may non-temporarily store the computer programs. The storage unit 703 may be realized as a non-volatile memory. The processor 701 is connected to the network through a communication device.

The computer program includes instructions performed by the processor 701, it is stored in a non-transitory computer readable storage medium, and the instructions allow the processor 701 to perform the operation of the present disclosure. The communication device 704 transmits and receives data through the network 400.

According to an embodiment, the computer program may be a vehicle server operating program. The program may include instructions for collecting broadcasting receiving information listened at a position for respective positions of the vehicles from the vehicle terminals boo to generate big data and store the big data, and learning a relationship between the position information and the broadcasting station title according to a machine learning based big data analysis to generate a broadcasting station title estimating model for estimating the broadcasting station title corresponding to the position information of the vehicle terminals. The storage unit 703 may include a big data database for storing big data including broadcasting station titles of the broadcasting channel serviced at position information for respective position information expressed in various ways.

The program may collect vehicle position information including latitudes and longitudes, and may use the vehicle position information to learn the broadcasting station title estimating model. The program may include instructions for setting the serviced broadcasting station titles with labels, learning the labelling data configured with various types of position information in which a plurality of broadcasting station titles are labelled and the big data according to the supervised learning method, and generating the broadcasting station title estimating model.

The program may further include instructions for inferring listening tendencies of the driver based on at least one of the time zone, the region, and the vehicle type according to the machine learning based big data analysis, and generating a broadcasting recommending model for recommending a broadcasting channel corresponding to the inferred listening tendencies.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of operating a vehicle server in line with a plurality of vehicle terminals, comprising:
    collecting, from the plurality of vehicle terminals, broadcasting station titles of broadcasting channels serviced at respective positions of the plurality of vehicle terminals, received by the plurality of vehicle terminals from a broadcasting station;
    collecting position information from the plurality of vehicle terminals;
    constructing big data based on the collected broadcasting station titles and position information;
    generating a broadcasting station title estimating model for estimating broadcasting station titles corresponding to the position information of the plurality of vehicle terminals by using big data constructed based on the collected broadcasting station titles and position information;
    generating a broadcasting recommending model for recommending a broadcasting channel corresponding to driver's listening tendencies inferred based on a time zone, a region, and a vehicle type;
    obtaining a position of a target vehicle terminal;
    estimating a broadcasting station title corresponding to the position of the target vehicle terminal using the broadcasting station title estimating model to transmit the estimated broadcasting station title to the target vehicle terminal; and
    determining at least one recommended broadcasting channel corresponding to a driver of the target vehicle terminal using the broadcasting recommending model to transmit information regarding the determined at least one recommended broadcasting channel to the target vehicle terminal,
    wherein the broadcasting station title estimating model is trained to learn a relationship between the position information and the broadcasting station titles by using labelling data configured with various pieces of position information.

2. The method of claim 1, wherein the constructing the big data includes:
    receiving broadcasting receiving information listened to at respective vehicle positions from the plurality of vehicle terminals; and
    constructing the big data by using the received broadcasting receiving information.

3. The method of claim 2, wherein:
    generating the broadcasting station title estimating model includes:
        generating the labelling data configured with various pieces of position information in which a plurality of broadcasting station titles are labelled from the big data; and
        generating the broadcasting station title estimating model by training the labelling data according to a supervised learning method.

4. The method of claim 2, wherein the listened to broadcasting receiving information is received through a connected car service (CCS) message.

5. The method of claim 1, further comprising, after generating the broadcasting station title estimating model, generating a broadcasting channel DB (database) on which estimated broadcasting station titles are mapped using the broadcasting station title estimating model for a plurality of predefined positions, and transmitting the broadcasting channel DB to the plurality of vehicle terminals.

6. The method of claim 1, wherein estimating the broadcasting station title estimating model; further comprises:
    receiving a broadcasting station title request including present vehicle position information from a vehicle terminal of the plurality of vehicle terminals;
    estimating a broadcasting station title corresponding to the present vehicle position information using the broadcasting station title estimating model; and
    transmitting the estimated broadcasting station title to the vehicle terminal of the plurality of vehicle terminals.

7. The method of claim 1, wherein the position information includes latitudes and longitudes.

8. A vehicle server comprising:
    a communication device for communicating with a plurality of vehicle terminals;
    a big data database for storing big data including broadcasting station titles of broadcasting channels serviced at respective positions;
    a memory with a vehicle server operating program stored thereon; and
    at least one processor for performing the vehicle server operating program,
    wherein the vehicle server operating program includes instructions for:
        generating a broadcasting station title estimating model for estimating broadcasting station titles corresponding to position information of the plurality of vehicle terminals by using big data constructed based on broadcasting station titles and position information collected from the plurality of vehicle terminals,
        generating a broadcasting recommending model for recommending a broadcasting channel corresponding to driver's listening tendencies inferred based on a time zone, a region, and a vehicle type,
        obtaining a position of a target vehicle terminal,
        estimating a broadcasting station title corresponding to the position of the target vehicle terminal using the broadcasting station title estimating model to transmit the estimated broadcasting station title to the target vehicle terminal, and
        determining at least one recommended broadcasting channel corresponding to a driver of the target vehicle terminal using the broadcasting recommending model to transmit information regarding the determined at least one recommended broadcasting channel to the target vehicle terminal,
    wherein the broadcasting station title estimating model is trained to learn a relationship between the position information and the broadcasting station titles by using labelling data configured with various pieces of position information.

9. The vehicle server of claim 8, wherein the vehicle server operating program further includes instructions for:
setting a plurality of serviced broadcasting station titles with labels;
learning the labelling data configured with various types of position information in which a plurality of broadcasting station titles are labelled using the big data according to a supervised learning method; and
generating the broadcasting station title estimating model.

10. The vehicle server of claim 8, wherein
the vehicle server operating program further includes instructions for:
collecting the position information from the plurality of vehicle terminals, wherein the position information includes latitudes and longitudes, and
using the collected position information to learn the broadcasting station title estimating model.

11. The vehicle server of claim 8, wherein the listened to broadcasting receiving information is received through a connected car service (CCS) message.

12. The vehicle server of claim 8, wherein the vehicle server operating program further includes instructions for:
after the generating the broadcasting station title estimating model, generating a broadcasting channel DB (database) on which estimated broadcasting station titles are mapped using the broadcasting station title estimating model for a plurality of predefined positions, and transmitting the broadcasting channel DB to the plurality of vehicle terminals.

13. The vehicle server of claim 8, wherein the vehicle server operating program further includes instructions for:
after the generating the broadcasting station title estimating model, receiving a broadcasting station title request including present vehicle position information from a vehicle terminal of the plurality of vehicle terminals;
estimating a broadcasting station title corresponding to the present vehicle position information using the broadcasting station title estimating model; and
transmitting the estimated broadcasting station title to the vehicle terminal of the plurality of vehicle terminals.

14. A non-transitory machine readable medium having stored thereon a program having a program code for performing, when the program is executed on at least one processor, the following steps:
collecting broadcasting station titles of broadcasting channels serviced at respective positions;
collecting position information from a plurality of vehicle terminals;
generating a broadcasting station title estimating model for estimating broadcasting station titles corresponding to the position information of the plurality of vehicle terminals by using big data constructed based on the collected broadcasting station titles and position information;
generating a broadcasting recommending model for recommending a broadcasting channel corresponding to driver's listening tendencies inferred based on a time zone, a region, and a vehicle type;
obtaining a position of a target vehicle terminal;
estimating a broadcasting station title corresponding to the position of the target vehicle terminal using the broadcasting station title estimating model to transmit the estimated broadcasting station title to the target vehicle terminal; and
determining at least one recommended broadcasting channel corresponding to a driver of the target vehicle terminal using the broadcasting recommending model to transmit information regarding the determined at least one recommended broadcasting channel to the target vehicle terminal,
wherein the broadcasting station title estimating model is trained to learn a relationship between the position information and the broadcasting station titles by using labelling data configured with various pieces of position information.

15. The non-transitory machine readable medium of claim 14, wherein the program code further includes instructions for:
receiving broadcasting receiving information listened to at respective vehicle positions from the plurality of vehicle terminals; and
constructing the big data by using the received broadcasting receiving information.

16. The non-transitory machine readable medium of claim 15, wherein:
the generating of the broadcasting station title estimating model includes:
generating the labelling data configured with various pieces of position information in which a plurality of broadcasting station titles are labelled from the big data; and
generating the broadcasting station title estimating model by training the labelling data according to a supervised learning method.

17. The non-transitory machine readable medium of claim 15, wherein the listened to broadcasting receiving information is received through a connected car service (CCS) message.

18. The non-transitory machine readable medium of claim 14, wherein the program further comprises program code for performing, when the program is executed on the at least one processor, the following steps:
after the generating the broadcasting station title estimating model:
generating a broadcasting channel DB (database) on which estimated broadcasting station titles are mapped using the broadcasting station title estimating model for a plurality of predefined positions, and transmitting the broadcasting channel DB to the plurality of vehicle terminals.

19. The non-transitory machine readable medium of claim 14, wherein the program further comprises program code for performing, when the program is executed on the at least one processor, the following steps:
after the generating the broadcasting station title estimating model, receiving a broadcasting station title request including present vehicle position information from a vehicle terminal of the plurality of vehicle terminals;
estimating a broadcasting station title corresponding to the present vehicle position information using the broadcasting station title estimating model; and
transmitting the estimated broadcasting station title to the vehicle terminal of the plurality of vehicle terminals.

20. The non-transitory machine readable medium of claim 14, wherein the position information includes latitudes and longitudes.

* * * * *